United States Patent
Johnson et al.

(10) Patent No.: US 7,672,240 B2
(45) Date of Patent: Mar. 2, 2010

(54) METHOD AND SYSTEM FOR USING BAYESIAN NETWORK INFERENCE FOR SELECTION OF TRANSPORT PROTOCOL ALGORITHM

(75) Inventors: Darrin P. Johnson, Mountain View, CA (US); Cesar A. C. Marcondes, Los Angeles, CA (US); Anders D. Persson, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 567 days.

(21) Appl. No.: 11/639,042

(22) Filed: Dec. 14, 2006

(65) Prior Publication Data

US 2008/0144663 A1 Jun. 19, 2008

(51) Int. Cl.
*G06F 11/00* (2006.01)
(52) U.S. Cl. .................. 370/235; 370/230; 370/469
(58) Field of Classification Search .......... 370/230, 370/230.1, 231, 232, 233, 234, 235, 237, 370/238, 465, 466, 468, 469
See application file for complete search history.

(56) References Cited

U.S. PATENT DOCUMENTS

| | | | | |
|---|---|---|---|---|
| 5,425,028 A | * | 6/1995 | Britton et al. ............... 370/389 |
| 6,757,736 B1 | * | 6/2004 | Hutchison et al. ........... 709/232 |
| 6,999,432 B2 | * | 2/2006 | Zhang et al. ................ 370/328 |
| 2002/0054578 A1 | * | 5/2002 | Zhang et al. ................ 370/328 |
| 2002/0152305 A1 | * | 10/2002 | Jackson et al. .............. 709/224 |
| 2004/0156392 A1 | * | 8/2004 | Walls et al. ................. 370/469 |
| 2005/0091269 A1 | * | 4/2005 | Gerber et al. ........... 707/103 X |
| 2006/0023631 A1 | * | 2/2006 | Nolte .......................... 370/235 |
| 2006/0239275 A1 | * | 10/2006 | Zlateff et al. ................ 370/400 |
| 2007/0002742 A1 | * | 1/2007 | Krishnaswamy et al. .... 370/235 |
| 2007/0091918 A1 | * | 4/2007 | Luo et al. .................... 370/465 |
| 2008/0144503 A1 | * | 6/2008 | Persson et al. .............. 370/235 |
| 2008/0144504 A1 | * | 6/2008 | Marcondes et al. ......... 370/235 |

* cited by examiner

*Primary Examiner*—Chi H. Pham
*Assistant Examiner*—Kevin Mew
(74) *Attorney, Agent, or Firm*—Osha • Liang LLP (57) ABSTRACT

A method for optimizing a network stack includes inputting network information into a transport protocol algorithm selector, inputting a first transport protocol algorithm into the transport protocol algorithm selector, analyzing a result of the transport protocol algorithm selector, selecting the first transport protocol algorithm based on the result, receiving a first packet in the network stack, and processing the first packet using the first transport protocol algorithm.

17 Claims, 8 Drawing Sheets

| 400<br>Parent States | 405<br>Child States | | |
|---|---|---|---|
| | 420<br>Child State 1 | 425<br>Child State 2 | 430<br>Child State 3 |
| 410<br>Parent State 1 | 435<br>Conditional Probability 1 | 440<br>Conditional Probability 2 | 445<br>Conditional Probability 3 |
| 415<br>Parent State 2 | 450<br>Conditional Probability 4 | 455<br>Conditional Probability 5 | 460<br>Conditional Probability 6 |

| 750 Transport Protocol Algorithm | 752 Path Bandwidth | | |
|---|---|---|---|
| | 754 10 Mb/s | 756 100 Mb/s | 758 1 Gb/s |
| 760 TCP Westwood | 768 0.025 | 770 0.525 | 772 0.45 |
| 762 TCP CUBIC | 774 0.025 | 776 0.525 | 778 0.45 |
| 764 HSTCP | 780 0.025 | 782 0.525 | 784 0.45 |
| 766 TCP NewReno | 786 0.025 | 788 0.525 | 790 0.45 |

METHOD AND SYSTEM FOR USING BAYESIAN NETWORK INFERENCE FOR SELECTION OF TRANSPORT PROTOCOL ALGORITHM

CROSS-REFERENCE TO RELATED APPLICATIONS

Subject matter contained herein may be related to subject matter contained in U.S. patent application Ser. No. 11/638,904, entitled: "Method and System for Bi-level Congestion Control for Multipath Transport"; U.S. patent application Ser. No. 11/638,777, entitled "Method and System for Offloaded Transport Layer Protocol Switching"; U.S. patent application Ser. No. 11/638,858, entitled "Method and System for Network Stack Tuning"; U.S. patent application Ser. No. 11/638,891, entitled "Method and System for Profiling and Learning Application Networking Behavior"; U.S. patent application Ser. No. 11/639,085, entitled "Method and System for Timestamping Data Packets From a Network"; and U.S. patent application Ser. No. 11/639,090, entitled "Method and System for Bandwidth Allocation Using Router Feedback"; and filed on Dec. 14, 2006, in the names of the same inventors and having the same assignee as the present application.

BACKGROUND

In the last several years, the Internet has evolved towards widespread sharing of all forms of information. The ease of creating a public website has led to a culture of individual self-publishing and co-operative publishing in the form of blogs, podcasts, wikis, and photo and video sharing. Voice Over Internet Protocol (VoIP) services have allowed the expansion of the Internet's communication capabilities. Sophisticated on-demand content provisioning has enabled the delivery of all forms of media across the Internet, including traditional media forms such as newspapers, radio, television, and movies. Greater bandwidth has moved traditionally local file backups and mirrors to locations that are accessed over a network. In addition, the Internet's peer-to-peer infrastructure has given rise to real-time data transmission as well as file sharing.

These changes have led to increased heterogeneity of media types and traffic, increased network complexity, reduced latency requirements, and increased bandwidth requirements. Often, network traffic seamlessly transitions through multiple wireless Local Area Network (LAN) standards (e.g., 802.11a, 802.11b, 802.11g, 802.11n), wireless Personal Area Network (PAN) standards such as Bluetooth® (Bluetooth is a registered trademark of Bluetooth Sig, Inc. of Delaware), wired standards such as Ethernet, and even storage area networks (SANs) and any associated network storage protocols. Furthermore, network traffic itself is composed of many different types of data, which are sent using various packet transmission patterns and protocols. For example, streaming video traffic is transmitted using a different protocol from VoIP traffic. Additionally, network applications, from weather simulations and telemetry to streaming media and VoIP, are demanding increased bandwidth and reduced latency from the Internet.

To operate in a heterogeneous, complex environment and meet bandwidth and latency requirements, a network connection is customized to handle different traffic patterns, types of data transmitted, and types of transmission media. However, before customization takes place, the network connection is characterized appropriately. For example, multiple Transmission Control Protocol (TCP) congestion control algorithms exist, with each algorithm designed to handle a particular set of network conditions. However, to effectively use a particular TCP congestion control algorithm, the network conditions are first determined, and the appropriate congestion control algorithm is selected for the established network conditions. Mechanisms are also put in place to deal with changing network conditions, traffic patterns, and network usage once the TCP congestion control algorithm is implemented.

SUMMARY

In general, in one aspect, the invention relates to a method for optimizing a network stack, comprising inputting network information into a transport protocol algorithm selector, inputting a first transport protocol algorithm into the transport protocol algorithm selector, analyzing a result of the transport protocol algorithm selector, selecting the first transport protocol algorithm based on the result, receiving a first packet in the network stack, and processing the first packet using the first transport protocol algorithm.

In general, in one aspect, the invention relates to a method for optimizing a network stack, comprising inputting network information into a transport protocol algorithm selector, inputting an expected result into the transport protocol algorithm selector, inferring a first transport protocol algorithm that produces the expected result using the transport protocol algorithm selector, receiving a first packet in the network stack, and processing the first packet using the first transport protocol algorithm.

In general, in one aspect, the invention relates to a system for selecting a transport protocol algorithm, comprising a network stack comprising network information, a transport protocol algorithm selector, comprising a plurality of inputs corresponding to a plurality of network conditions based on the network information and the transport protocol algorithm, and a plurality of outputs corresponding to a plurality of results, wherein the plurality of results is used to select the transport protocol algorithm for use on the network stack.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to select a transport protocol algorithm based on a set of network conditions. A transport protocol corresponds to a protocol used in the transport layer of a network stack, such as Transmission Control Protocol (TCP) or Usergram Data Protocol (UDP). A transport protocol algorithm corresponds to a particular implementation of a transport protocol. In addition, a transport protocol algorithm is associated with a congestion control mechanism.

Specifically, embodiments of the invention provide a method and system to select a transport protocol algorithm using a Bayesian network. In one embodiment of the invention, network conditions are provided as inputs to the Bayesian network, and a transport protocol algorithm is selected based on one or more results of the Bayesian network. The transport protocol algorithm may be selected by inputting the network conditions and different transport protocol algorithms and selecting the transport protocol algorithm that produces an optimal result. Alternatively, the transport protocol algorithm may be selected by inputting the network conditions and expected results and selecting the transport protocol algorithm that provides the highest probability of producing the expected results given the network conditions. Further, inline estimators may be used to monitor network characteristics after a transport protocol algorithm is selected, and estimates from the inline estimators may be used to update the Bayesian network with the network characteristics in real-time.

Figure 1:
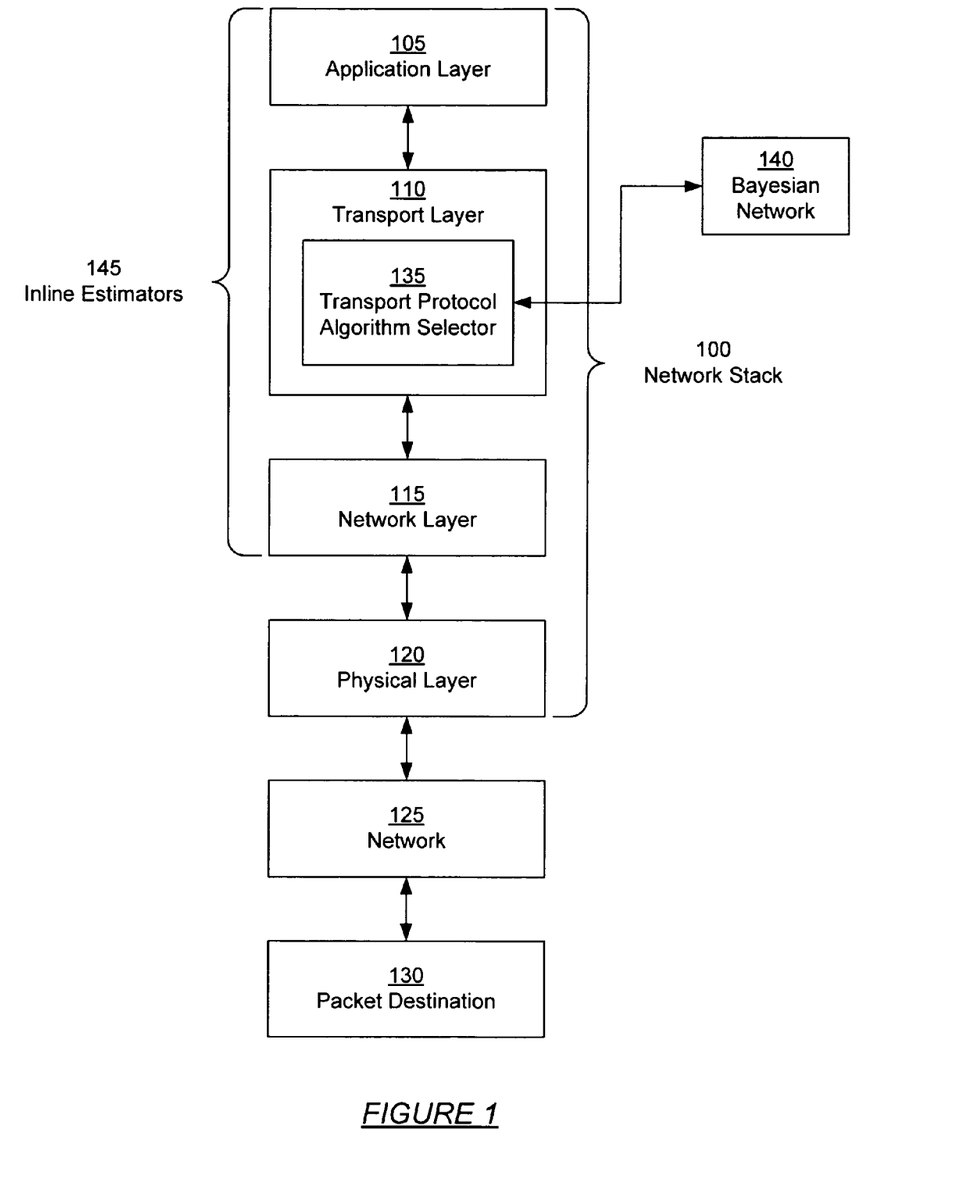
FIG. 1 shows a schematic diagram of a system in accordance with one or more embodiments of the invention.

FIG. 1 shows a schematic diagram of a system in accordance with one or more embodiments of the invention. As shown in FIG. 1, the system includes a network stack (100), which includes an application layer (105), a transport layer (110), a network layer (115), and a physical layer (120). Inline estimators (145) may be present in the application layer (105), the transport layer (110), and the network layer (115), or any combination thereof. As shown in FIG. 1, the network stack (100) is operatively connected to a packet destination (130) via a network (125). Each of these components is described in further detail below.

In one embodiment of the invention, the network stack (100) corresponds to a software implementation of a computer networking protocol suite. In other words, the network stack (100) includes mechanisms in software for allowing communication between computer systems. In one or more embodiments of the invention, computer systems are able to communicate with one another using packets sent across one or more networks (125), which include local area networks (LANs), wide area networks (WANs), campus area networks (CANs), metropolitan area networks (MANs), home area networks (HANs), and wireless networks. Each network (125) is also associated with one or more protocols, which dictate how data is transferred between the computer systems.

In one or more embodiments of the invention, each layer (e.g., application layer (105), transport layer (10), network layer (115), physical layer (120)) of the network stack (100) is associated with one or more protocols to facilitate the transmission of information between the network stack (100) and a packet destination (130) on the network (125). In one or more embodiments of the invention, a packet destination (130) refers to a computer on the network (125), or an application on the computer. In one or more embodiments of the invention, each protocol in the network stack (100) performs tasks for a specific layer (e.g., application layer (105), transport layer (110), network layer (115), physical layer (120)) of the network stack (100) and communicates with protocols in the layer above and the layer below. For example, a protocol in the network layer (115) may communicate with one or more protocols in the physical layer (120), as well as one or more protocols in the transport layer (110). In one or more embodiments of the invention, the network stack (100) is implemented using a set of protocols found in the Internet Protocol (IP) suite.

Within the network stack (100), the physical layer, in one embodiment of the invention, (120) regulates the transmission of bits over the network (125) between the network stack (100) and the packet destination (130). The bits may be transmitted over a variety of transmission media, including optical fiber, twisted pair cables, coaxial cables, and wireless antennae. In one or more embodiments of the invention, the physical layer (120) provides an electrical, mechanical, and procedural interface to the transmission media used by the network (125). In one or more embodiments of the invention, the physical layer (120) is also associated with data link capability, which provides data transfer across a physical transmission medium. As mentioned previously, the physical layer (120) is may be associated with one or more protocols Asynchronous Transfer Mode (ATM), Ethernet, Bluetooth®, Universal Serial Bus (USB), FireWire, and Wi-Fi.

In one embodiment of the invention, the network layer (115) is responsible for end-to-end transmission of data between the network stack (100) and a packet destination (130). In one or more embodiments of the invention, the network layer (115) provides functional and procedural mechanisms for transferring variable-length data sequences from the network stack (100) to a packet destination (130) via one or more networks (125). In one or more embodiments of the invention, the network layer (115) performs network routing, flow control, network segmentation and desegmentation, and/or error control functions. Protocols associated with the network layer (115) may include, but are not limited to, Internet Protocol (IP), Address Resolution Protocol (ARP), and Datagram Delivery Protocol (DDP).

In one embodiment of the invention, the transport layer (110) provides transparent transfer of data between the network stack (100) and a packet destination (130). The transport layer (110) may also be responsible for end-to-end error recovery, flow control, and ensuring complete and cost-effective data transfer. Services provided by the transport layer (110) may include creating a connection between the network stack (100) and a packet destination (130), guaranteeing same order delivery of packets, providing a checksum of packet contents, regulating packet flow between the network stack (100) and packet destination (130), and providing multiple ports on the network stack (100). In one or more embodiments of the invention, ports are used to distinguish between network traffic bound for various networking applications in the application layer (105). Protocols associated with the transport layer may include, but are not limited to, Transmission Control Protocol (TCP), User Datagram Protocol (UDP), Datagram Congestion Control Protocol (DCCP), and Stream Control Transmission Protocol (SCTP).

In one embodiment of the invention, the application layer (105) provides services directly to applications in the application layer (105). For example, the application layer (105) is used by an application associated with the network stack (100) to communicate with an application associated with a packet destination (130). The application layer (105) may also be used to format data received from the transport layer (110) into a form that is usable by an application. In one or more embodiments of the invention, the application layer (105) provides encryption of data before the data is sent through the network (125) to a packet destination (130). Protocols associated with the application layer may include, but are not limited to, HyperText Transfer Protocol (HTTP), File Transfer Protocol (FTP), Lightweight Directory Access Protocol (LDAP), and Simple Network Management Protocol (SNMP). In one or more embodiments of the invention, the application layer (105) includes one or more applications that communicate with one or more packet destinations (130) via a network (125).

As shown in FIG. 1, the transport layer (110) includes a transport protocol algorithm selector (135). In one or more embodiments of the invention, the transport protocol algorithm selector (135) is configured to select a transport protocol algorithm to be used in the transport layer (110). In one or more embodiments of the invention, a transport protocol algorithm refers to a particular implementation of a transport protocol, such as TCP or UDP. In one or more embodiments of the invention, a transport protocol algorithm is associated with a congestion control mechanism, which regulates network traffic flow. In one or more embodiments of the invention, a transport protocol algorithm is designed to send packets optimally over a particular kind of network. In other words, a first transport protocol algorithm may work better than second transport protocol algorithm for a given set of network conditions, but the second transport protocol algorithm may perform better than the first for another set of network conditions. For example, TCP algorithms include Hamilton TCP, TCP Westwood, and FAST TCP, where each of the aforementioned algorithms was designed for a specific set of network conditions. In particular, Hamilton TCP was designed to improve the stability of TCP on high bandwidth-delay product (BDP) networks, such as satellite networks; TCP Westwood was designed to support wireless networks; and FAST TCP was designed to support high-speed, long distance links.

In one or more embodiments of the invention, the transport protocol algorithm selector (135) is configured to select a transport protocol algorithm based on information about the network (125) (i.e., network information). In one or more embodiments of the invention, network information includes elements such as bandwidth, propagation delay, round trip time, and system load. In one or more embodiments of the invention, network information is inputted into the transport protocol algorithm selector (135), and a transport protocol algorithm is selected based on the inputted network information. Once the selected transport algorithm is operating, the selected transport protocol algorithm may be changed, in real-time, based on updated network information.

In one or more embodiments of the invention, the transport protocol algorithm selector (135) uses a Bayesian network (140) to select a transport protocol algorithm. In one or more embodiments of the invention, network conditions and a transport protocol algorithm are supplied as inputs into the Bayesian network (140). Based on expected results from inputting the network conditions and transport protocol algorithm, a transport protocol algorithm is selected for use in the transport layer (110). In one or more embodiments of the invention, a transport protocol algorithm is selected by examining the results produced by various transport protocol algorithms under given network conditions and selecting the algorithm that produces an optimal or desired result. Alternatively, the network conditions and desired results are input into the Bayesian network (140), and the transport protocol algorithm with the highest probability of producing the expected results is selected. The Bayesian network (140) is explained in greater detail in FIGS. 2-4.

In one or more embodiments of the invention, the Bayesian network (140) is trained using data obtained from simulations that test the performance of transport protocol algorithms on different network conditions. For example, different TCP algorithms may be tested on network conditions simulating wired networks, wireless networks, satellite networks, etc., and a set of results, such as available bandwidth, loss rate, and buffer size, may be recorded. In one or more embodiments of the invention, network conditions correspond to network scenarios specified in the TIA-921 standard. The results of the simulations are then inputted into the Bayesian network (140) and statistical techniques, such as expectation maximization, are used to fill in other nodes of the Bayesian network. In one or more embodiments of the invention, an appropriate network structure is found for the Bayesian network (140) by creating a graph of the space of network structures and using a scoring function to determine the best network structure. An example scoring function is a likelihood function with a separate parameter for model complexity. In one or more embodiments of the invention, a heuristic search algorithm, such as gradient descent, a Markov Chain Monte Carlo, or hill climbing, is used to traverse the graph and find an optimal network structure without iterating through every possible network structure.

Those skilled in the art will appreciate that another mathematical or computational model may be used to determine a suitable transport protocol algorithm for the network stack (100). For example, instead of a Bayesian network (140), the transport protocol algorithm selector (135) may use an artificial neural network, radial basis function, or other statistical modeling structure to select a transport protocol algorithm. The transport protocol algorithm selector (135) may also use combinations of different data structures and algorithms to determine the best transport protocol algorithm for different combinations of network conditions.

Those skilled in the art will also appreciate that the Bayesian network may be trained using other techniques. For example, a genetic algorithm may be used to evolve a Bayesian network (140) for use in the network stack (100), or an imputation method may be used to fill in unknown variables in the Bayesian network (140).

The system of FIG. 1 also includes inline estimators (145) in the application layer (105), transport layer (110), and network layer (115). In one or more embodiments of the invention, the inline estimators (145) correspond to statistical estimators that gather data inline with the layers of the network stack (100) and produce estimates based on the data. Examples of statistical estimators include maximum likelihood estimators, Bayes estimators, minimum mean squared error estimators, best linear unbiased estimators, etc. In one or more embodiments of the invention, each inline estimator (145) is associated with a specific characteristic of the network stack (100) or network traffic flowing through the network stack. For example, one inline estimator (145) may be responsible for monitoring link speed, one inline estimator (145) may be used to monitor inter-packet spacing, and so on. In one or more embodiments of the invention, estimates from the inline estimators (145) may be used to tune (i.e., modify) the network stack (100). For example, an estimate for path bandwidth may be used to set a packet rate that corresponds to the path bandwidth.

In one or more embodiments of the invention, estimates from the inline estimators (145) are used to update the Bayesian network (140) in real-time. As stated above, embodiments of the invention provide a mechanism for populating the Bayesian network (140) using data obtained through simulations. The Bayesian network (140) is then used to select a transport protocol algorithm for a set of network conditions. In one or more embodiments of the invention, the selected transport protocol algorithm is used in the transport layer (110) to regulate traffic flow through the network stack (100). Further, while the transport protocol algorithm is used to control network traffic, the inline estimators (145) collect and analyze data from the network traffic to obtain a set of estimates. The estimates may then be used to update the posterior probabilities in the Bayesian network (140). In one or more embodiments of the invention, an anytime inference algorithm is used to update the Bayesian network (140) in real-time.

For example, a transport protocol algorithm is selected for use in the transport layer (110) using the Bayesian network (140). However, once in use, estimates from the inline estimators (145) indicate that the network characteristics do not correspond with the predicted results of the Bayesian network (140). As a result, the posterior probabilities of the Bayesian network (140) are updated to reflect the real-world conditions observed by the inline estimators (145). In addition, changes to the structure of the Bayesian network (140) may be made, or hidden variables may be found by the inline estimators (145) and incorporated into the Bayesian network (140), if the scoring function allows such an increase in model complexity. If the Bayesian network (140) has become too complex, or if the conditional probabilities have become too skewed in favor of one or more transport protocol algorithms, the Bayesian network (140) may then be reset to the default values.

Figure 2:
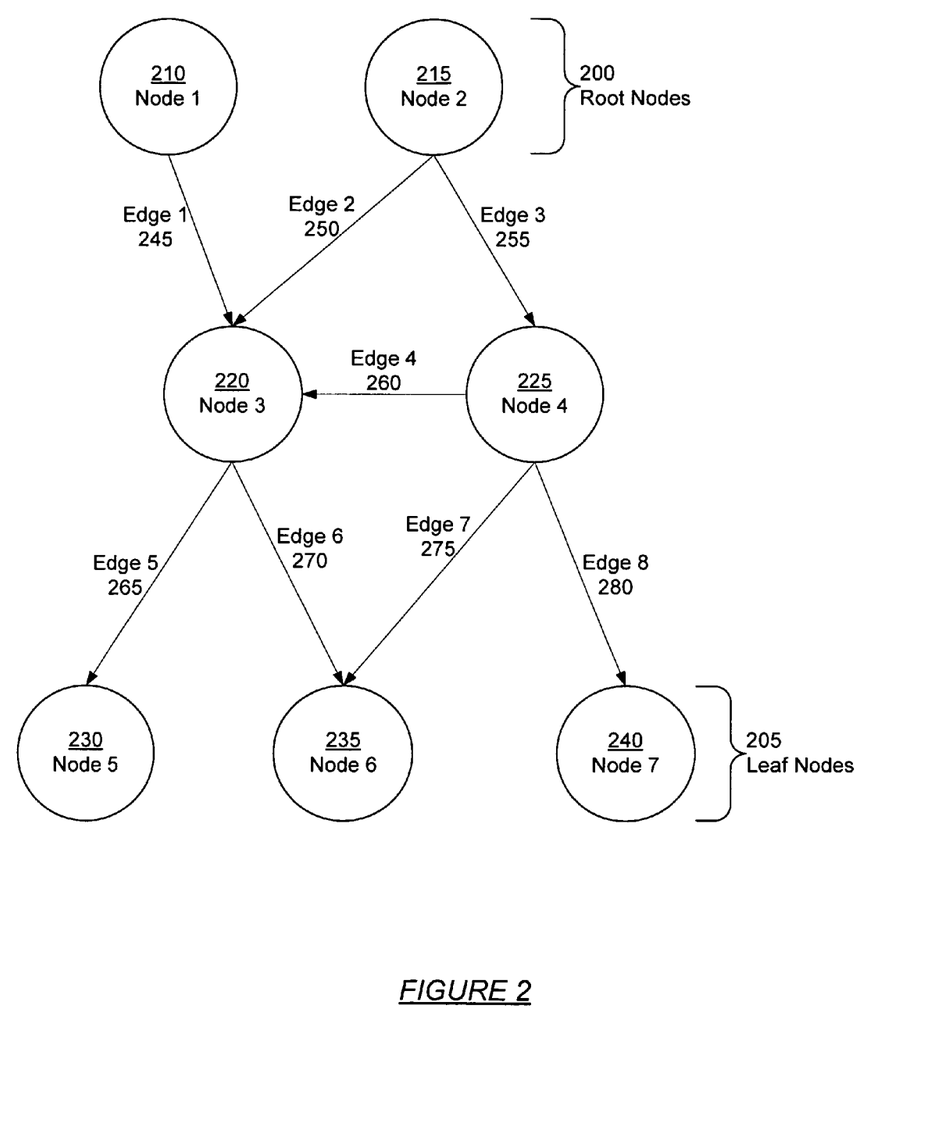
FIG. 2 shows a Bayesian network in accordance with one or more embodiments of the invention.

FIG. 2 shows a Bayesian network in accordance with one or more embodiments of the invention. As shown in FIG. 2, the Bayesian network includes seven nodes (e.g., node 1 (210), node 2 (215), node 3 (220), node 4 (225), node 5 (230), node 6 (235), node 7 (240)) in total, some of which are root nodes (200), and some of which are leaf nodes (205). Each of the nodes is connected to at least one other node with a directed edge (e.g., edge 1 (245), edge 2 (250), edge 3 (255), edge 4 (260), edge 5 (265), edge 6 (270), edge 7 (275), edge 8 (280)). Those skilled in the art will appreciate that the Bayesian network may include a greater or fewer number of nodes connected with different types of directed edges in order to perform different functions.

In one or more embodiments of the invention, a Bayesian network corresponds to a directed acyclic graph where the nodes of the graph represent variables, and the edges of the graph represent statistical dependence relations among the variables and local probability distributions for each variable given values of the variable's parents. As shown in FIG. 2, edge 1 (245) indicates that node 1 (210) is a parent of node 3 (220) and implies that node 3 (220) has a statistical dependence on node 1 (210). In other words, a value of node 1 (210) influences the value of node 3 (220). For example, if node 1 (210) corresponds to weather and node 3 (220) corresponds to road conditions, the dependence of node 3 (220) on node 1 (210) indicates that road conditions (e.g., wet, dry, dusty, icy, etc.) are affected by the weather (e.g., sunny, cloudy, rainy, snowy, hail, etc.).

In one or more embodiments of the invention, root nodes (200) correspond to nodes that have no parent nodes. For example, node 1 (210) and node 2 (215) are root nodes (200) because they do not depend on other nodes in the Bayesian network. On the other hand, leaf nodes (205) correspond to nodes that have no children. For example, node 5 (230), node 6 (235), and node 7 (240) are leaf nodes (205) because they do not influence any other nodes in the Bayesian network. Those skilled in the art will appreciate that a node cannot be both a root node (200) and a leaf node (205) because the node must be connected to the rest of the Bayesian network using at least one directed edge. Further, because the Bayesian network is an acyclic graph, two nodes cannot exhibit cyclic dependencies between one another.

In one or more embodiments of the invention, the Bayesian network is used to perform probabilistic inference. In one or more embodiments of the invention, probabilistic inference is performed by inputting values of evidence variables, or variables with observed states. As stated above, each node corresponds to a variable. Once the evidence nodes have been updated with the observed states, the posterior distribution of the other nodes can be computed. In one or more embodiments of the invention, evidence nodes correspond to the root nodes (200), and decisions are made based on the posterior probabilities of the leaf nodes (205). Examples of probabilistic inference algorithms include variable elimination, Markov Chain Monte Carlo simulation, clique tree propagation, and recursive conditioning.

As shown in FIG. 2, a posterior probability of a node may depend on multiple other nodes. Further, a posterior probability of a node may be influenced both directly and indirectly by another node. For example, node 2 (215) directly influences node 3 (220) via edge 2 (250). Node 2 (215) also directly influences node 4 (225) through edge 3 (255), and then indirectly influences node 3 (220) through edge 4 (260), which connects node 3 (220) and node 4 (225). Node 2 (215) also influences node 6 (235) through node 3 (220) and node 4 (225), which are parents of node 6 (235) due to edge 6 (270) and edge 7 (275). In one or more embodiments of the invention, the posterior probabilities are used to infer a result. In one or more embodiments of the invention, the result is derived from posterior probabilities of the leaf nodes (205).

Figure 3:
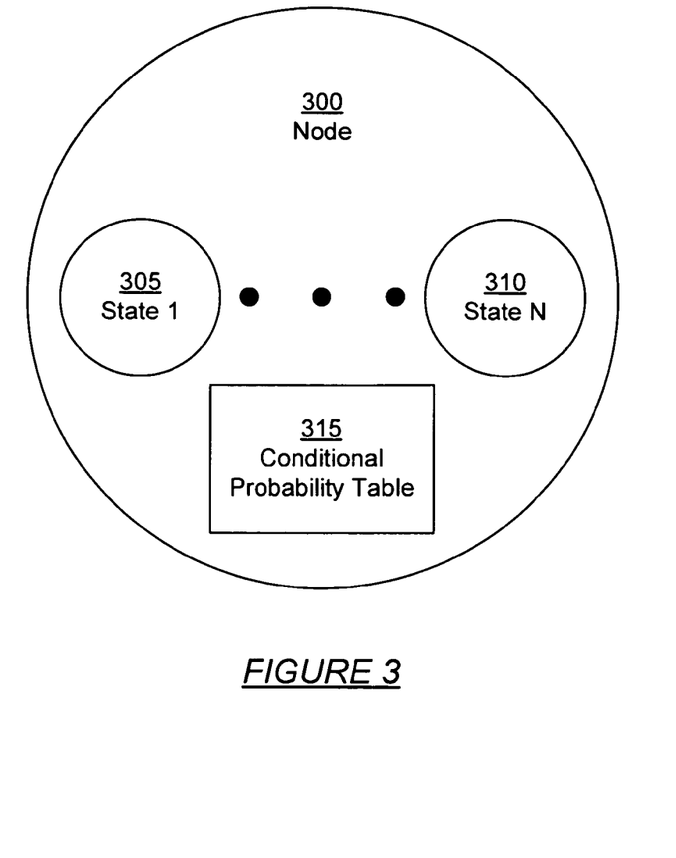
FIG. 3 shows a Bayesian network node in accordance with one or more embodiments of the invention.

FIG. 3 shows a Bayesian network node in accordance with one or more embodiments of the invention. As depicted in FIG. 3, the node (300) includes multiple states (e.g., state 1 (305), state n (310)) and a conditional probability table (315). In one or more embodiments of the invention, the node (300) corresponds to a node in the Bayesian network of FIG. 2. As mentioned previously, the node (300) corresponds to a variable, which may be a measured parameter, a latent variable, or a hypothesis. In one or more embodiments of the invention, the node (300) is a function, such as a Gaussian function, of the parents of the node (300).

The states (e.g., state 1 (305), state n (310)) of the node (300) refer to the possible values of the variable represented by the node (300). For example, a variable representing system load may have three states representing a light load, a medium load, and a heavy load. A light load may correspond to a load number of 0 to 20, a medium load may correspond to a load number of 20 to 50, and a heavy load may correspond to a load number of 50 and above. Those skilled in the art will appreciate that the load number may be generated from different criteria, such as number of waiting processes, disk input/output (I/O), network I/O, and Random Access Memory (RAM) usage. Those skilled in the art will also appreciate that the load number may be calculated differently for the same set of criteria depending on how the criteria is weighted. The variable may also have states representing all possible values within a particular range instead of states representing ranges. For example, the system load variable may have a state for each possible load number a system may experience. Those skilled in the art will appreciate that the number of states of a variable is affected by the precision of the variable's measurement. For example, a variable representing a system load between 1 and 20 may include 20 states if the system load is measured to a precision of one, or the variable may include 201 states if the system load is measured to a precision of $1/10^{th}$.

In one or more embodiments of the invention, the states (e.g., state 1 (305), state n (310)) of the node (300) represent different discrete choices rather than ranges of values or continuous values. For example, if the node (300) represented different types of transport protocol algorithms, the states (e.g., state 1 (305), state n (310)) may include all transport protocol algorithms available for the system, such as TCP Westwood, TCP CUBIC, HSTCP, and TCP NewReno. Regardless of the discrete or continuous nature of the states (e.g., state 1 (305), state n (310)), the states of the node (300) must be collectively exhaustive and mutually exclusive. In other words, all possible values of the variable represented by the node (300) are enumerated in the states (e.g., state 1 (305), state n (310)), and no two states can occur at the same time.

The node (300) also includes a conditional probability table (315). In one or more embodiments of the invention, the conditional probability table (315) includes probabilities of the different states (e.g., state 1 (305), state n (310)) of the node (300) given prior information about the parent(s) of the node (300). The conditional probability table is explained in further detail in FIG. 4.

Figure 4:
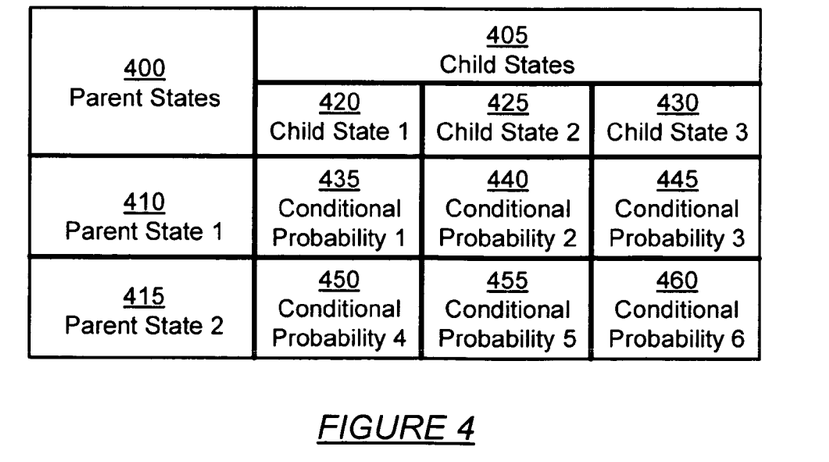
FIG. 4 shows a conditional probability table in accordance with one or more embodiments of the invention.

FIG. 4 shows a conditional probability table in accordance with one or more embodiments of the invention. The conditional probability table includes a set of parent states (400) (e.g., parent state 1 (410), parent state 2 (415)), a set of child states (405) (e.g., child state 1 (420), child state 2 (425), child state 3 (430)), and a set of conditional probabilities (e.g., conditional probability 1 (435), conditional probability 2 (440), conditional probability 3 (445), conditional probability 4 (450), conditional probability 5 (455), conditional probability 6 (460)) at the intersection of the rows of parent states (400) and columns of child states (405). In one or more embodiments of the invention, the conditional probability table corresponds to the conditional probability table (315) of the node shown in FIG. 3.

In one or more embodiments of the invention, the child states (405) correspond to the states of the node in which the conditional probability table resides. In one or more embodiments of the invention, the parent states (400) correspond to the states of one or more parent nodes of the node that includes the conditional probability table. In one or more embodiments of the invention, each parent node is given a column in the conditional probability table, with all possible states of the parent node listed in the column. As shown in FIG. 4, the conditional probability table only includes one column of parents states (400), indicating that the node only has one parent. However, the conditional probability table may include more columns of parent states (400) if the node included additional parents. In one or more embodiments of the invention, the conditional probability table may omit parent states (400) if the node is a root node.

In one or more embodiments of the invention, the conditional probability of a child state (e.g., child state 1 (420), child state 2 (425), child state 3 (430)) given a parent state (e.g., parent state 1 (410), parent state 2 (415)) is stored at the intersection of the child state and parent state in the conditional probability table. For example, suppose that given the observation of parent state 1 (410), child state 1 (420) has a 40 percent chance of occurring, child state 2 (425) has a 10 percent chance of occurring, and child state 3 (430) has a 50 percent chance of occurring. As a result, conditional probability 1 (435) has a value of 0.4, conditional probability 2 (440) has a value of 0.1, and conditional probability 3 (445) has a value of 0.5. In one or more embodiments of the invention, the conditional probabilities of all possible child states (405) given a parent state (400) sum to one. In other words, one of the child states (405) will occur regardless of the observed parent state (400); the parent state (400) simply determines the likelihood of each child state (405) occurring.

In one or more embodiments of the invention, evidence is used to update one or more nodes in the Bayesian network. Evidence may include hard evidence, where a node is determined to be in one state with 100 percent probability, and soft evidence, where probabilities are distributed among the different states of the node. Once evidence is introduced into the Bayesian network, the conditional probability table(s) of the node(s) associated with the evidence may be updated to reflect the evidence. The updated conditional probabilities may then be passed to child nodes, where the conditional probabilities of the child node states are updated using the conditional probability tables found in the child nodes. The process continues until conditional probabilities for all nodes have been updated in view of the evidence.

For example, suppose conditional probability 1 (435) has a value of 0.3, conditional probability 2 (440) has a value of 0.6, conditional probability 3 (445) has a value of 0.1, conditional probability 4 (450) has a value of 0.2, conditional probability 5 (455) has a value of 0.2, and conditional probability 6 (460) has a value of 0.6. Evidence is received that indicates that parent state 1 (410) will occur with a probability of 0.8, and parent state 2 (415) will occur with a probability of 0.2. The joint probabilities of each child state (405) and parent state (400) pair may then be updated based on the evidence. After updating, conditional probability 1 (435) has a value of 0.3*0.8, or 0.24, conditional probability 2 (440) has a value of 0.6*0.8, or 0.48, conditional probability 3 (445) has a value of 0.1*0.8, or 0.08, and so on. As a result, the new conditional probabilities reflect the likelihood that a particular pair of parent states (400) and child states (405) will occur once evidence about the likelihood of the parent states (400) occurring is introduced. Because one pair of parent states (400) and child states (405) is bound to occur due to the mutually exclusive and collectively exhaustive nature of the states, the sum of all updated conditional probabilities is equal to one.

Figure 5:
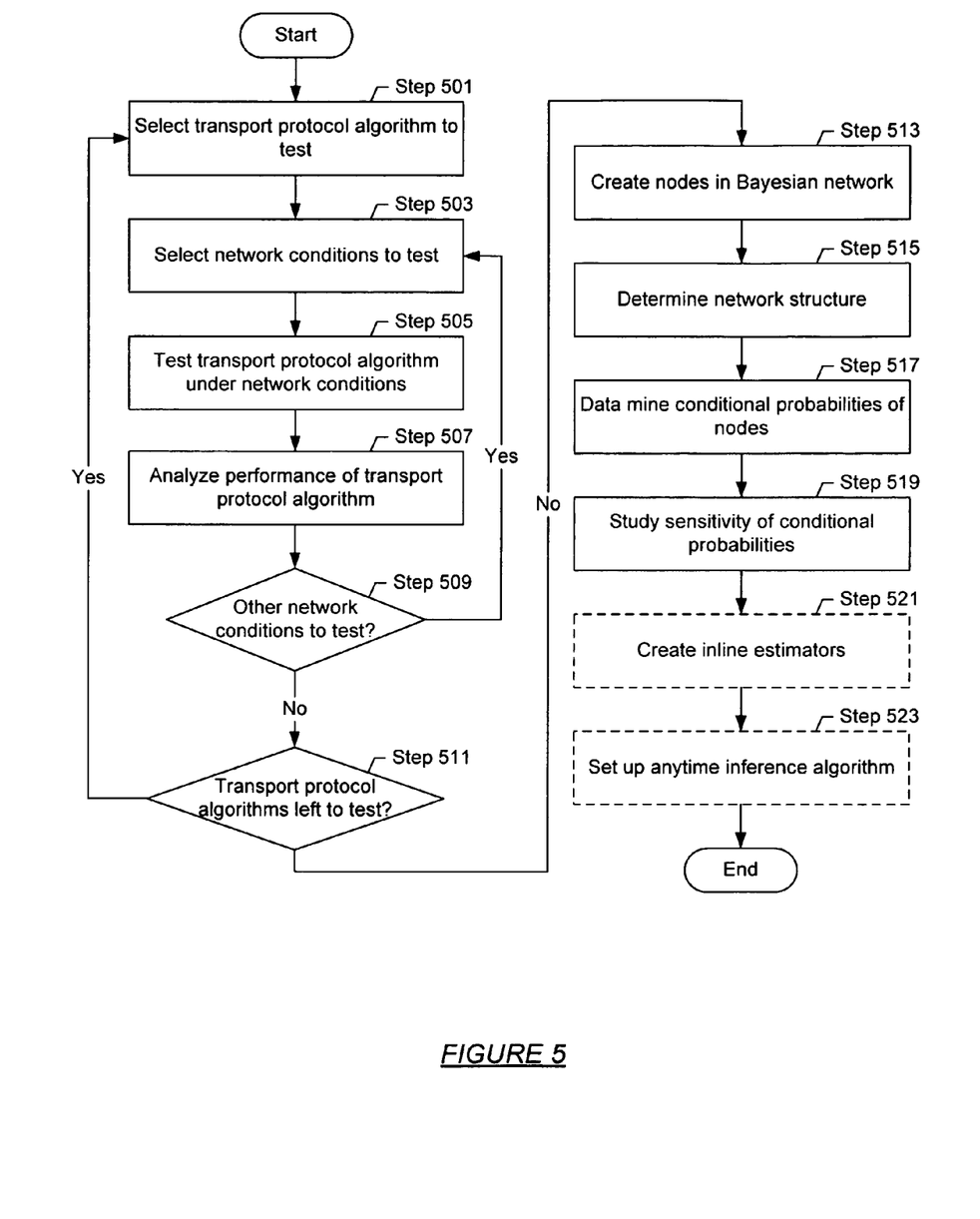
FIGS. 5-6 show flow diagrams in accordance with one or more embodiments of the invention.

FIG. 5 shows a flow diagram of a Bayesian network creation in accordance with one or more embodiments of the invention. In one or more embodiments of the invention, one or more of the steps described below may be omitted, repeated, and/or performed in a different order. Accordingly, the specific arrangement of steps shown in FIG. 5 should not be construed as limiting the scope of the invention.

Initially, different transport protocol algorithms are tested under various network conditions. Specifically, a transport protocol algorithm is selected for testing (Step 501). As mentioned previously, a transport protocol algorithm corresponds to a particular implementation of a transport protocol, such as TCP or UDP. The transport protocol algorithm may also include a congestion control mechanism. Network conditions to test are also selected (Step 503), and the transport protocol algorithm is tested under the network conditions (Step 505). For example, the TCP Westwood algorithm may be tested under network conditions that simulate an 802.11b wireless network. In one or more embodiments of the invention, the test is performed in a regulated laboratory setting, as opposed to a real-world network. Alternatively, the tests may be performed using a real-world network. In one or more embodiments of the invention, the network conditions are derived from scenarios in the TIA-921 network model. In one or more embodiments of the invention, network characteristics refer to different elements of a network, and network conditions refer to the possible values a network characteristic may have. For example, network characteristics may include bandwidth, throughput, loss rate, buffer size, etc.; network conditions may include a bandwidth of 1 Gb/s, buffer size of 100 Mb, loss rate of one packet per thousand, etc.

The performance of the transport protocol algorithm is subsequently analyzed (Step 507). A determination then made about whether other network conditions are to be tested on the transport protocol algorithm (Step 509). For example, a transport protocol algorithm may be tested on a wired network, multiple wireless networks, a satellite network, etc. If other network conditions remain to be tested, the next set of network conditions is selected (Step 503), the transport protocol algorithm is tested on the new network conditions (Step 505), and network characteristics are collected from the test (Step 507). If all network conditions for a particular transport protocol algorithm have been tested, other transport protocol algorithms may be tested (Step 511). If another transport protocol algorithm is to be tested, the transport protocol algorithm is selected (Step 501) and tested using the same or different sets of network conditions (Step 503-Step 509), as described above.

Using the data collected from the tests, the nodes of the Bayesian network are created (Step 513). As stated above, a node corresponds to a variable, whether observed or unobserved. A variable may also correspond to a network characteristic, whether observed or unobserved. For example, nodes for the Bayesian network may correspond to the transport protocol algorithm, system load, bandwidth, buffer size, etc. The network structure of the Bayesian network is also determined (Step 515). The network structure may be generated by performing a heuristic search of all possible network structures using a scoring function, using an analysis of the data obtained from the tests, using expert information, any combination thereof. For example, a list of network structures may be created using test data and expert information, then a network structure that best models the test data is selected using a hill climbing algorithm. As another example, an initial network structure may be created by an expert, then augmented by analyzing the performances of various transport protocol algorithms on various network conditions (Step 501-Step 511).

The conditional probabilities of the nodes are also data mined (Step 517) from the test data. In one or more embodiments of the invention, statistical techniques, such as clustering or classification methods, are used to mine the conditional probabilities and states of the nodes. The sensitivities of the conditional probabilities (Step 519) are also studied. For example, different sets of test evidence may be introduced to the Bayesian network to observe the Bayesian network's behavior. If the conditional probabilities skew the Bayesian network too much in one direction or another, the conditional probabilities may be adjusted to balance the Bayesian network.

Optionally, inline estimators are created (Step 521). In one or more embodiments of the invention, inline estimators are used in the network stack to collect information about the network stack as network traffic passes through. In one or more embodiments of the invention, the inline estimators are used to analyze the performance of the transport protocol algorithm on network traffic. In one or more embodiments of the invention, estimates from the inline estimators are used to train the Bayesian network in real-time. Inline estimators may correspond to maximum likelihood estimators, minimum mean squared error estimators, best linear unbiased estimators, minimum variance unbiased estimators, etc.

Optionally, an anytime inference algorithm is set up (Step 523) to obtain inferences from the Bayesian network in real-time. In one or more embodiments of the invention, the anytime inference algorithm may be used to compute posterior probabilities of the Bayesian network in view of evidence observed from the inline estimators. In one or more embodiments of the invention, the anytime inference algorithm produces a result from the Bayesian network given a set of time and memory constraints. In one or more embodiments of the invention, the anytime inference algorithm uses an exact inference algorithm, such as variable elimination, if time constraints are not imposed. If time constraints are imposed, a stochastic method, such as Monte Carlo simulation or belief propagation, may be used.

Figure 6:
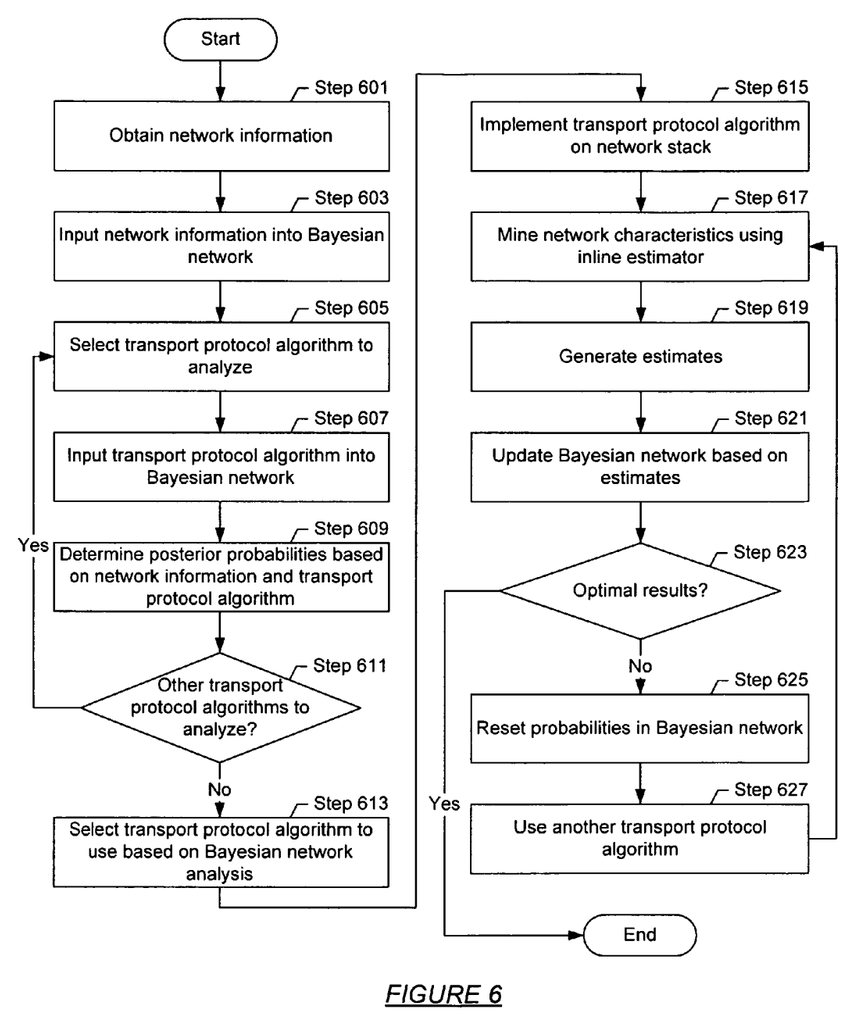

FIG. 6 shows a flow diagram of transport protocol algorithm selection in accordance with one or more embodiments of the invention. In one or more embodiments of the invention, one or more of the steps described below may be omitted, repeated, and/or performed in a different order. Accordingly, the specific arrangement of steps shown in FIG. 6 should not be construed as limiting the scope of the invention.

Initially, network information is obtained (Step 601). Network information may correspond to known network conditions, such as round trip time, link time, bandwidth, error rate, delay, etc. The network information is inputted into the Bayesian network (Step 603). In one or more embodiments of the invention, the network information is inputted into the root nodes of the Bayesian network. A transport algorithm is also selected for analysis (Step 605) and inputted into the Bayesian network (Step 607). As with the network information, the transport algorithm may be inputted into a root node of the Bayesian network.

The posterior probabilities of the Bayesian network are then calculated, based on the network information and the transport protocol algorithm (Step 609). A determination is then made about whether other transport protocol algorithms need to be analyzed (Step 611). If so, the next transport protocol algorithm is selected (Step 605), inputted into the Bayesian network (Step 607), and posterior probabilities for that transport protocol algorithm are calculated (Step 609). This process is repeated until all transport protocol algorithms have been analyzed with the network information.

The analysis of the transport protocol algorithms is used to select a transport protocol algorithm (Step 613) that produces a best or desired result. The selected transport protocol algorithm is subsequently implemented on the network stack (Step 615) to control network traffic on the network stack. To monitor the performance of the transport protocol algorithm, as well as the overall performance of the network stack, inline estimators may be used to mine network characteristics (Step 617) in various layers of the network stack. Estimates are then generated from the data mined by the inline estimators (Step 619) and used to update the Bayesian network (Step 621). In one or more embodiments of the invention, the estimates are used as evidence in the Bayesian network, and the posterior probabilities are then recalculated in light of the new evidence to determine if the initially selected transport protocol algorithm (i.e., the transport protocol algorithm selected in Step 613) is optimal (Step 623). In one or more embodiments of the invention, an anytime inference algorithm is used to recalculate the posterior probabilities of the Bayesian network.

If the initially selected transport protocol algorithm selection is not optimal (based for example on the information obtained in Steps 617-621), the probabilities in the Bayesian network are reset (Step 625) to initial values and another transport protocol algorithm is used (Step 627). In one or more embodiments of the invention, the transport protocol algorithm that performed most closely to the first transport protocol algorithm during analysis (Step 605-Step 611) is used in place of the first transport protocol algorithm. Alternatively, a transport protocol algorithm produced from the anytime inference may be used.

With the new transport protocol algorithm in place, inline estimators may then be used to mine network characteristics (Step 617) and generate estimates (Step 619). The estimates are used to update the Bayesian network (Step 621) and analyze the performance of the new transport protocol algorithm (Step 623). If the new transport protocol algorithm is not performing optimally, the probabilities are reset again (Step 625) and another transport protocol algorithm is used (Step 627) until a transport protocol algorithm is found that does optimally regulate network traffic.

Figure 7A:
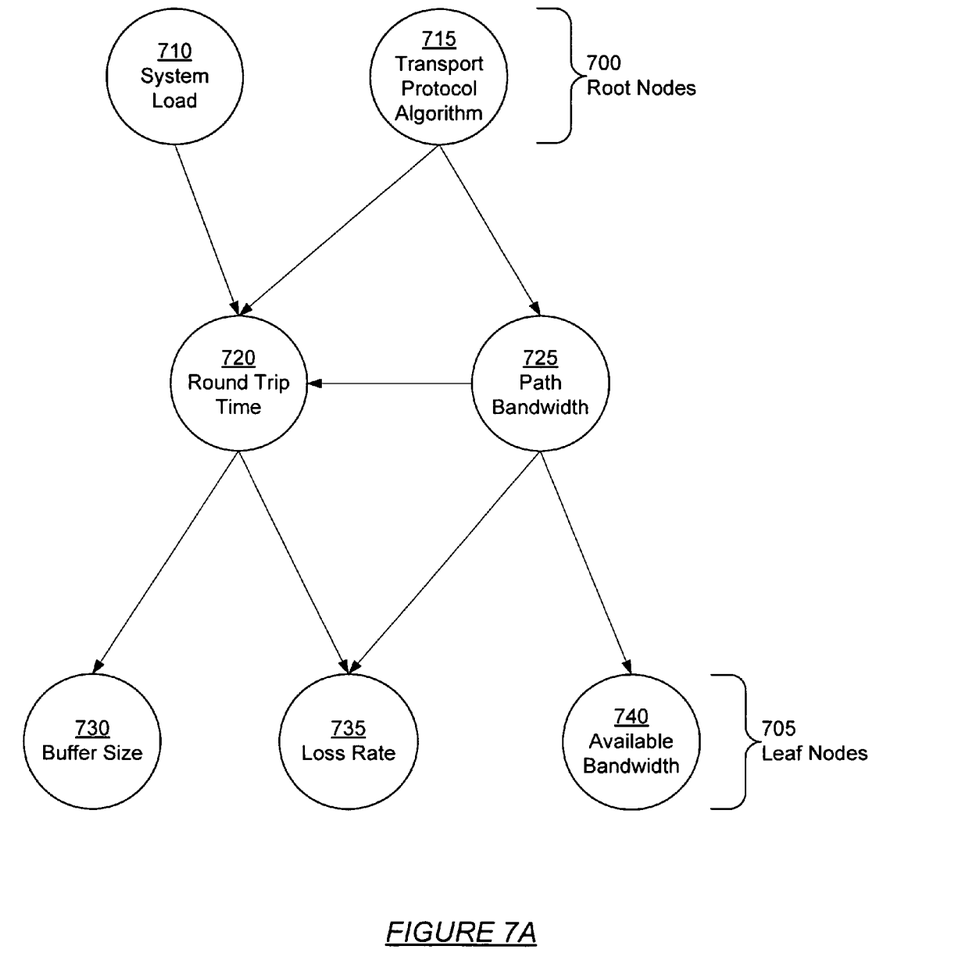
FIG. 7A shows a Bayesian network in accordance with one or more embodiments of the invention.

FIG. 7A shows an exemplary Bayesian network in accordance with one or more embodiments of the invention. The example shown in FIG. 7A is not intended to limit the scope of the invention.

Continuing with FIG. 7A, the Bayesian network includes seven nodes representing variables for system load (710), transport protocol algorithm (715), round trip time (720), path bandwidth (725), buffer size (730), loss rate (735), and available bandwidth (740). Root nodes (700) include nodes for system load (710) and transport protocol algorithm (715). Leaf nodes (705) include nodes for buffer size (730), loss rate (735), and available bandwidth (740). Those skilled in the art will appreciate that a Bayesian network for selecting a transport protocol algorithm (715) may include additional nodes, exclude certain nodes depicted in FIG. 7A, use a different network structure, etc.

In one or more embodiments of the invention, the system load (710) and transport protocol algorithm (715) are input into the Bayesian network. An inference algorithm, such as variable elimination or Monte Carlo simulation, is then used to calculate the posterior probabilities of the leaf nodes (705). In one or more embodiments of the invention, the posterior probabilities of the leaf nodes (705) predict how well a particular transport protocol (715) will perform based on the system load (710). In one or more embodiments of the invention, an observed state of each root node (700) is inputted as evidence. For example, if the states for system load (710) include light, moderate, and heavy, evidence may be inputted regarding the probability of the system load (710) being light, moderate, or heavy. The transport protocol algorithm (715) may be inputted as 100 percent for a particular algorithm and 0 percent for all other algorithms. Alternatively, the transport protocol algorithm (715) may list equal probabilities for all algorithms such that an appropriate algorithm may be selected when leaf node (705) values are specified.

As shown in FIG. 7A, the round trip time (720) and path bandwidth (725) are calculated from the system load (710) and transport protocol algorithm (715). As stated above, the round trip time (720) and path bandwidth (725) nodes each include conditional probability tables that calculate joint probabilities of their various states (i.e., network conditions) and states of the system load (710) and transport protocol algorithm (715) given prior information about the system load (710) and the transport protocol algorithm (715). The calculated probabilities are then forwarded to the nodes for buffer size (730), loss rate (735), and available bandwidth (740) and used to calculate posterior probabilities for those nodes. The posterior probabilities may be recorded, and a new transport protocol algorithm (715) selected. After all transport protocol algorithms (725) have been iterated through, the transport protocol algorithm (725) with the best performance is selected. For example, the transport protocol algorithm (725) that provides the highest available bandwidth (740), lowest loss rate (735), and/or largest buffer size (730) may be used in the network stack.

Alternatively, the probabilities of the leaf nodes (705) may be specified in place of the transport protocol algorithm (715). The transport protocol algorithm (715) that most likely provides the conditions described in the leaf nodes (705) is then picked. For example, a large buffer size (730), medium loss rate (735), and high available bandwidth (740) may be specified in the leaf nodes. Probabilities for the round trip time (720) and path bandwidth (725) may then be calculated such that the probabilities in the leaf nodes (705) are produced, and the probabilities for round trip time (720) and path bandwidth (725) are then used to calculate the optimal transport protocol algorithm (715).

Figure 7B:
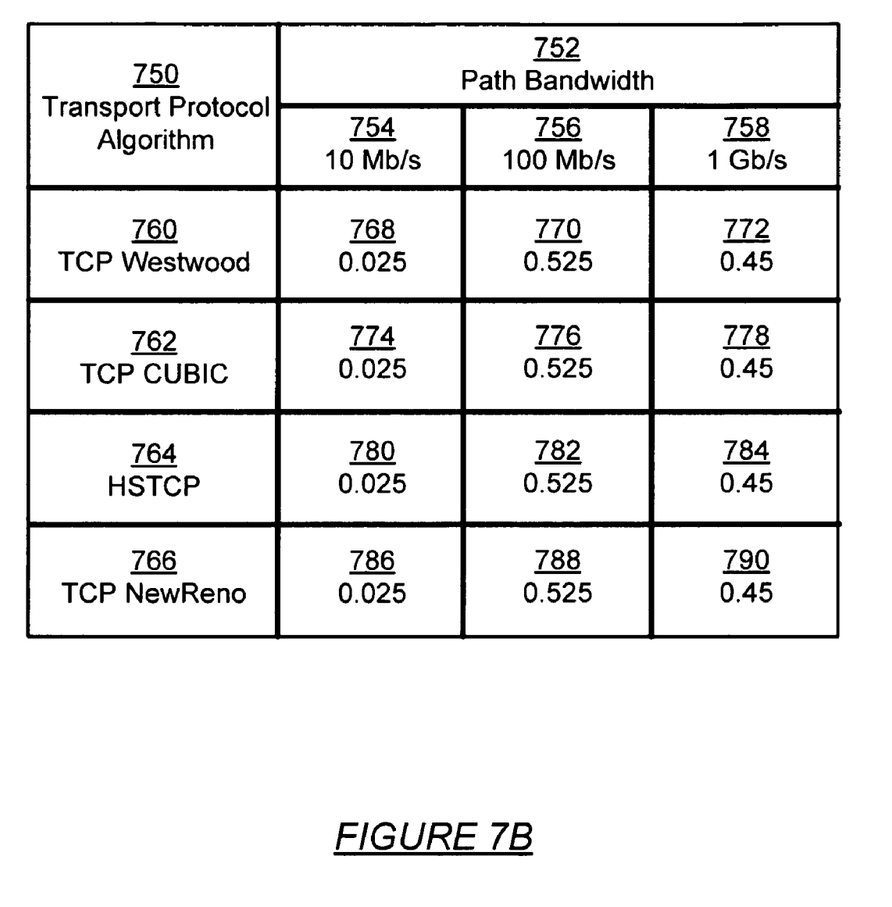
FIG. 7B shows a conditional probability table in accordance with one or more embodiments of the invention.

FIG. 7B shows an exemplary conditional probability table in accordance with one or more embodiments of the invention. The example shown in FIG. 7A is not intended to limit the scope of the invention.

In one or more embodiments of the invention, the conditional probability table of FIG. 7B corresponds to the path bandwidth node (725) of FIG. 7A. As shown in FIG. 7B, the conditional probability table includes four transport protocol algorithms (750) (e.g., TCP Westwood (760), TCP CUBIC (762), HSTCP (764), TCP NewReno (766)), which correspond to the states of the parent node for transport protocol algorithm (750). Three path bandwidths (752) are also listed, with values of 10 Mb/s (754), 100 Mb/s (756), and 1 Gb/s (758). In one or more embodiments of the invention, the path bandwidths (752) correspond to the child states of the conditional probability table. In other words, the path bandwidths (752) correspond to the states of the node in which the conditional probability table is stored.

In one or more embodiments of the invention, the conditional probabilities of the path bandwidths (752) given the selection of a transport protocol algorithm (750) are listed at the intersection of the rows of transport protocol algorithms (e.g., TCP Westwood (760), TCP CUBIC (762), HSTCP (764), TCP NewReno (766)) and columns of path bandwidths (e.g., 10 Mb/s (754), 100 Mb/s (756), 1 Gb/s (758)). For example, the conditional probability of a path bandwidth (752) of 1 Gb/s (758) given the selection of TCP Westwood (760) is 0.45 (772). In one or more embodiments of the invention, the states of a node are collectively exhaustive and mutually exclusive. As a result, each of the conditional probabilities in a row adds up to one. For example, given a selection of HSTCP (764), the conditional probabilities of the different path bandwidths (752) of 10 Mb/s (754), 100 Mb/s (756), and 1 Gb/s (758) are 0.025 (780), 0.525 (782), and 0.45 (784), respectively, which add up to one. Those skilled in the art will appreciate that the conditional probability table may include different types and numbers of parent states (i.e., transport protocol algorithm (750)) and child states (i.e., path bandwidth (752)), as well as different conditional probability values.

Figure 8:
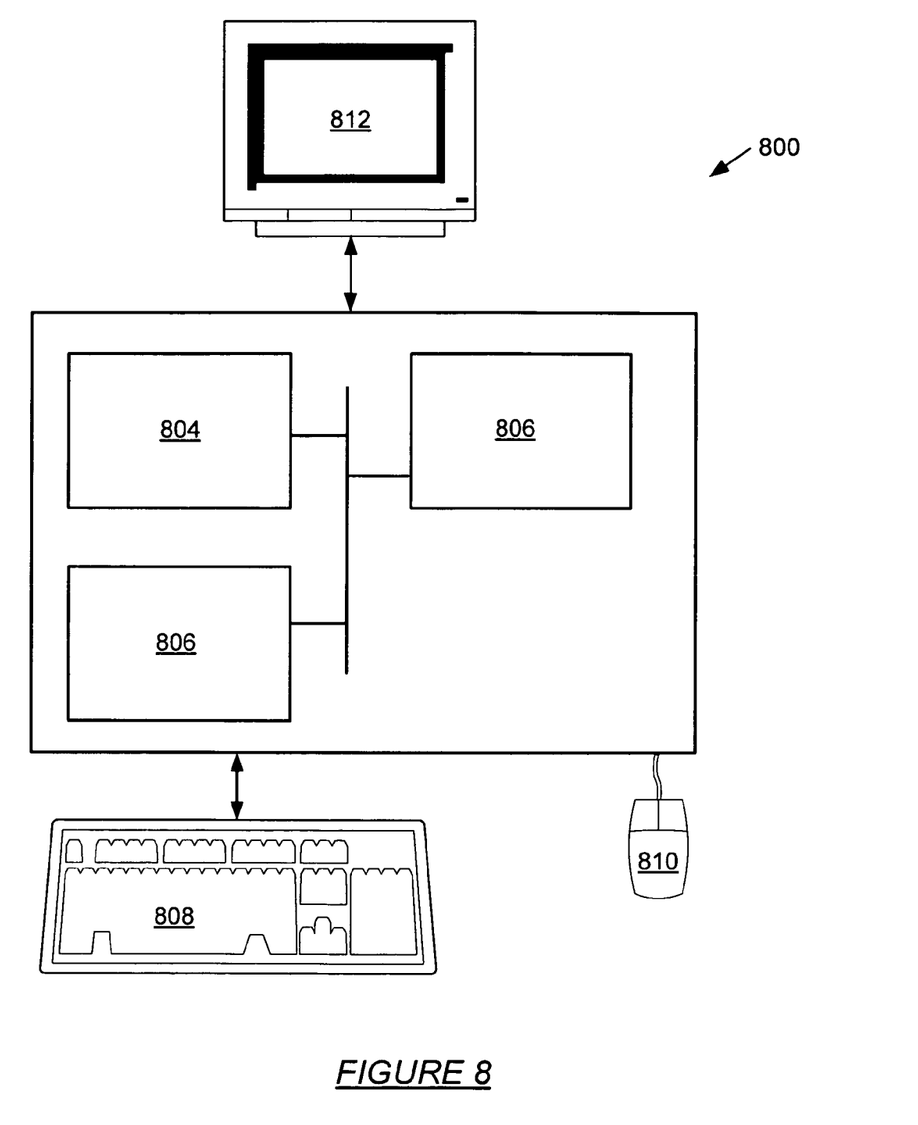
FIG. 8 shows a computer system in accordance with one or more embodiments of the invention.

The invention may be implemented on virtually any type of computer regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) is connected to a local area network (LAN) or a wide area network (e.g., the Internet) (not shown) via a network interface connection (not shown).

Those skilled in the art will appreciate that these input and output means may take other forms.

Further, those skilled in the art will appreciate that one or more elements of the aforementioned computer system (800) may be located at a remote location and connected to the other elements over a network. Further, the invention may be implemented on a distributed system having a plurality of nodes, where each portion of the invention (e.g., network stack, Bayesian network, inline estimators, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable medium comprising computer readable program code embodied therein for causing a computer system to perform a method for optimizing a network stack, the method comprising:
    inputting network information into a transport protocol algorithm selector;
    inputting a first transport protocol algorithm into the transport protocol algorithm selector,
        wherein the transport protocol algorithm selector uses a Bayesian network, and
        wherein the Bayesian network comprises a plurality of nodes, wherein each of the nodes is one selected from a group consisting of the first transport protocol algorithm and one of a plurality of network conditions;
    analyzing a result of the transport protocol algorithm selector;
    selecting the first transport protocol algorithm based on the result;
    receiving a first packet in the network stack; and
    processing the first packet using the first transport protocol algorithm.

2. The computer readable medium of claim 1, further comprising:
    mining a network characteristic from the network information using an inline estimator on the network stack;
    generating an estimate of the network characteristic using the inline estimator; and
    updating the transport protocol algorithm selector based on the estimate.

3. The computer readable medium of claim 1, further comprising:
    determining an optimality of the first transport protocol algorithm;
    selecting a second transport protocol algorithm based on the optimality of the first transport protocol algorithm;
    receiving a second packet in the network stack; and
    processing the second packet using the second transport protocol algorithm.

4. The computer readable medium of claim 3, further comprising:
    resetting the transport protocol algorithm selector based on the optimality of the first transport protocol algorithm.

5. The computer readable medium of claim 1, wherein the result is obtained using an anytime inference algorithm.

6. The computer readable medium of claim 1, wherein the plurality of network conditions include at least one selected from a group consisting of a system load, a round trip time, a path bandwidth, a buffer size, a loss rate, and an available bandwidth.

7. The computer readable medium of claim 1, wherein the result comprises a leaf node in the Bayesian network.

8. A computer system for selecting a transport protocol algorithm, comprising:
    a processor;
    a memory;
    a network stack executing on the processor and comprising network information;
    a transport protocol algorithm selector executing on the processor and configured to:
        supply, to a Bayesian network, a plurality of inputs corresponding to a plurality of network conditions based on the network information and the transport protocol algorithm, wherein the plurality of inputs correspond to a plurality of root nodes in the Bayesian network; and
        calculate a plurality of outputs corresponding to a plurality of results, wherein the plurality of outputs correspond to a plurality of leaf nodes in the Bayesian network,
    wherein the plurality of results is used to select the transport protocol algorithm for use on the network stack.

9. The computer system of claim 8, further comprising:
    an inline estimator on the network stack,
    wherein the inline estimator is used to mine a network characteristic of the network stack and generate an estimate of the network characteristic, and
    wherein the estimate is used to update the transport protocol algorithm selector.

10. The computer system of claim 8, wherein the plurality of results is obtained using an anytime inference algorithm.

11. The computer system of claim 8, wherein an inline estimator is used to determine an optimality of the first transport protocol algorithm, and wherein a second transport protocol algorithm is used on the network stack based on the optimality of the first transport protocol algorithm.

12. The computer system of claim 11, wherein the transport protocol algorithm selector is reset based on the optimality of the first transport protocol algorithm.

13. A computer readable medium comprising computer readable program code embodied therein for causing a computer system to perform a method for optimizing a network stack, the method comprising:
    inputting network information into a transport protocol algorithm selector;
    inputting a first transport protocol algorithm into the transport protocol algorithm selector, wherein the transport protocol algorithm selector uses a Bayesian network, and;
    analyzing a result of the transport protocol algorithm selector, wherein the result comprises a leaf node in the Bayesian network;
    selecting the first transport protocol algorithm based on the result;
    receiving a first packet in the network stack; and
    processing the first packet using the first transport protocol algorithm.

14. The computer readable medium of claim 13, further comprising:

mining a network characteristic from the network information using an inline estimator on the network stack;

generating an estimate of the network characteristic using the inline estimator; and updating the transport protocol algorithm selector based on the estimate.

15. The computer readable medium of claim 13, further comprising:

determining an optimality of the first transport protocol algorithm;

selecting a second transport protocol algorithm based on the optimality of the first transport protocol algorithm;

receiving a second packet in the network stack; and processing the second packet using the second transport protocol algorithm.

16. The computer readable medium of claim 15, farther comprising:

resetting the transport protocol algorithm selector based on the optimality of the first transport protocol algorithm.

17. The computer readable medium of claim 13, wherein the result is obtained using an anytime inference algorithm.

* * * * *

UNITED STATES PATENT AND TRADEMARK OFFICE
CERTIFICATE OF CORRECTION

PATENT NO.        : 7,672,240 B2                                                                Page 1 of 1
APPLICATION NO.   : 11/639042
DATED             : March 2, 2010
INVENTOR(S)       : Darrin P. Johnson et al.

It is certified that error appears in the above-identified patent and that said Letters Patent is hereby corrected as shown below:

In Claim 16, Column 18 (line 6), please replace the word "farther" with --further--.

Signed and Sealed this

Eighteenth Day of May, 2010

David J. Kappos
*Director of the United States Patent and Trademark Office*